(12) United States Patent  
Protter et al.

(10) Patent No.: US 8,013,462 B2
(45) Date of Patent: Sep. 6, 2011

(54) WAVE ENERGY CONVERTER

(75) Inventors: Nigel Peter Webb Protter, Pemberton (CA); Bradley Jason Buckham, Victoria (CA); Scott James Beatty, Victoria (CA)

(73) Assignee: SyncWave Energy Inc., Langley, British Columbia (CA)

( * ) Notice: Subject to any disclaimer, the term of this patent is extended or adjusted under 35 U.S.C. 154(b) by 359 days.

(21) Appl. No.: 12/300,671

(22) PCT Filed: May 29, 2007

(86) PCT No.: PCT/CA2007/000961
§ 371 (c)(1),
(2), (4) Date: Nov. 13, 2008

(87) PCT Pub. No.: WO2007/137426
PCT Pub. Date: Jun. 12, 2007

(65) Prior Publication Data
US 2009/0146429 A1 Jun. 11, 2009

Related U.S. Application Data

(60) Provisional application No. 60/803,459, filed on May 30, 2006.

(51) Int. Cl.
*F03B 13/20* (2006.01)
(52) U.S. Cl. .......................... 290/53; 290/42
(58) Field of Classification Search .......... 290/42–43, 290/53–54; 60/495–500, 502, 698; 405/75–76
See application file for complete search history.

(56) References Cited

U.S. PATENT DOCUMENTS

| 5,132,550 | A |   | 7/1992  | McCabe |
|-----------|---|---|---------|--------|
| 5,179,837 | A |   | 1/1993  | Sieber |
| 5,394,695 | A |   | 3/1995  | Sieber |
| 5,685,147 | A | * | 11/1997 | Brassea ..................... 60/496 |
| 6,857,266 | B2|   | 2/2005  | Dick   |
| 7,076,949 | B2| * | 7/2006  | Fernandez Gomez et al. . 60/498 |

(Continued)

FOREIGN PATENT DOCUMENTS

CA 2412724 A1 12/2001
(Continued)

OTHER PUBLICATIONS

Bracewell, R.H. "FROG and PS FROG: A Study of Two Reactionless Ocean Wave Energy Converters." PhD Thesis, Lancaster University, 1990.

*Primary Examiner* — Michael C Zarroli
(74) *Attorney, Agent, or Firm* — Oyen Wiggs Green & Mutala LLP

(57) ABSTRACT

A wave energy converter has a primary body interconnected to a secondary body such that the bodies may oscillate longitudinally relative to one another. A slug mass is viscoelastically connected to the primary body. The slug mass has effective mass, stiffness and damping characteristics. A generator is drivingly connected between the primary and secondary bodies. The generator has a load damping characteristic. At least one of the characteristics is dynamically controllable, allowing the bodies' longitudinal motion to be varied in response to wave motion changes of the wave environment in which the wave energy converter is deployed, to maintain out-of-phase oscillation of the bodies, thus increasing the driving force imparted to the generator and thereby increasing the generator's electrical energy output.

29 Claims, 10 Drawing Sheets

U.S. PATENT DOCUMENTS

| | | |
|---|---|---|
| 7,140,180 B2 | 11/2006 | Gerber et al. |
| 7,323,790 B2 * | 1/2008 | Taylor et al. .................... 290/42 |
| 7,443,046 B2 * | 10/2008 | Stewart et al. .................. 290/53 |
| 2007/0068153 A1 | 3/2007 | Gerber |
| 2007/0132432 A1 | 6/2007 | Sieber |
| 2007/0273156 A1 * | 11/2007 | Miyajima et al. ............... 290/53 |
| 2008/0309088 A1 * | 12/2008 | Agamloh et al. ............... 290/53 |
| 2009/0085357 A1 * | 4/2009 | Stewart .......................... 290/53 |

FOREIGN PATENT DOCUMENTS

| | | |
|---|---|---|
| CA | 2566928 A1 | 12/2001 |
| EP | 1439306 A1 | 7/2004 |
| GB | 2414771 A | 12/2005 |
| WO | 94/15096 A1 | 7/1994 |
| WO | 01/73289 A1 | 10/2001 |
| WO | 03/014560 A2 | 2/2003 |
| WO | 2005/040603 A1 | 5/2005 |
| WO | 2005/085632 A1 | 9/2005 |
| WO | 2006/122397 A1 | 11/2006 |
| WO | 2008/009131 A1 | 1/2008 |

* cited by examiner

WAVE ENERGY CONVERTER

REFERENCE TO RELATED APPLICATION

This application claims the benefit of U.S. provisional patent application Ser. No. 60/803,459 filed 30 May 2006 which is incorporated herein by reference.

TECHNICAL FIELD

This disclosure pertains to conversion of wave energy to electrical or other commercially useful energy.

BACKGROUND

Wave energy (i.e. the energy of periodically oscillating waves on an ocean, sea, lake or other large body of water) can be converted to electrical energy by using the waves' buoyant force to cause a floating body to oscillate (i.e. bob up and down with the waves). The buoyant force which the waves exert on the floating body must react against an opposing body to facilitate conversion of the floating body's kinetic energy into commercially useful energy. The seabed, or a piling embedded in the seabed and capable of withstanding wave loads, may serve as the opposing body. Such "single body" systems have only one floating body, and a stationary opposing body. The kinetic energy produced as the floating body oscillates relative to the stationary opposing body is converted to electrical energy by a generator coupled between the two bodies.

Single body systems are typically employed near shore, in relatively shallow water in which suitable piling or mooring structures can be provided to serve as a stationary opposing body for a floating body to react against. Single body systems are not well suited to deep water use, since it is difficult to provide deep water piling or mooring structures capable of withstanding the full range of hydrodynamic forces encountered in deep water wave environments. Near shore, the piling or mooring structure of a single body wave energy converter can also interfere with seabed ecosystems, which is undesirable.

"Two-body" wave energy converters typically provide a second floating body (or a submerged or semi-submerged body) to act in opposition to the first, or primary, floating body. A two-body wave energy converter can be slack-moored to the seabed, and is sometimes called "reactionless" since the slack mooring does not transmit to the seabed the reaction forces caused by oscillation of the primary and secondary bodies relative to one another.

Two-body wave energy converters are commonly designed to emulate the performance of single body systems, such that the second floating body remains relatively stationary and the generator is driven primarily by a single oscillating motion—that of the primary floating body. However it is advantageous to allow the primary and secondary bodies to oscillate longitudinally relative to one another, and to dynamically control such oscillation in response to changes of the wave environment in which the wave energy converter is deployed. As explained below, such control facilitates maximization of the relative motion between the primary and secondary bodies, increasing the driving force imparted to the generator and thereby increasing the generator's electrical energy output.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
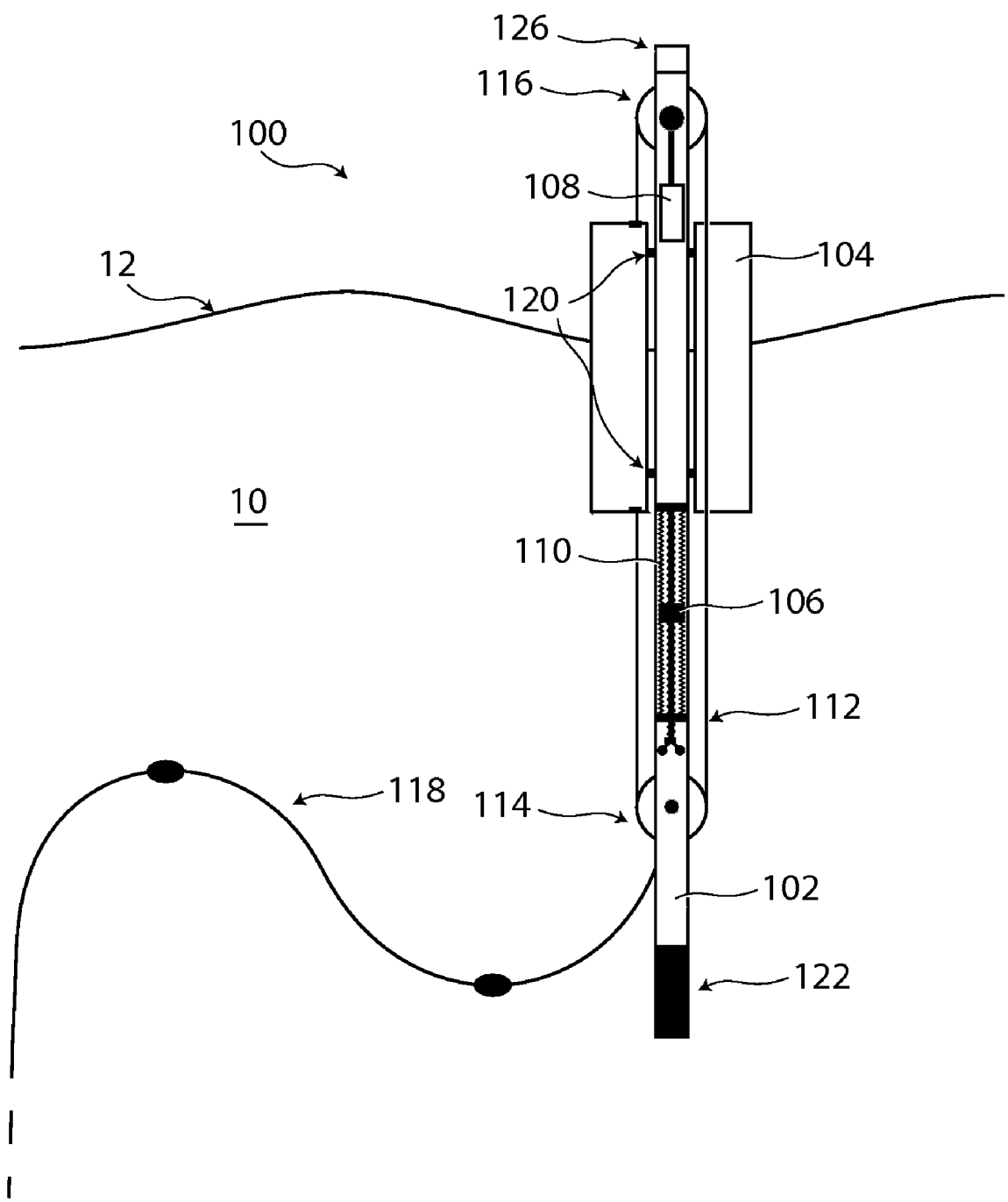
FIG. 1 is a schematic front elevation view of a two-body wave energy converter.

FIG. 1 depicts a two-body wave energy converter 100 floating in a body of water 10 and piercing the surface of waves 12 which propagate across body of water 10. Wave energy converter 100 has a primary surface-piercing floating body, namely internal pillar 102; and a secondary surface-piercing floating body, namely float 104 which is external to pillar 102. Advantageously, pillar 102 and float 104 each have a deep draft—as deep as is practically feasible in the wave environment in which wave energy converter 100 is deployed. Bearings 120 permit longitudinally slidable oscillation of pillar 102 and float 104 relative to one another. Slug body 106 is contained within and coupled to pillar 102 by visco-elastic connection 110. Alternatively, slug body 106 may be located outside pillar 102 and coupled to pillar 102 by visco-elastic connection 110.

Pillar 102 and float 104 are interconnected by cable 112, which is entrained over lower and upper pulleys 114, 116. One end of cable 112 is fixed to the lower end of float 104. The opposite end of cable 112 is fixed to the upper end of float 104. Lower pulley 114 is rotatably mounted to a lower portion of pillar 102. Upper pulley 116 is rotatably mounted to an upper portion of pillar 102. Generator 108 is drivingly coupled to upper pulley 116 to facilitate extraction of electrical energy from wave energy converter 100. Specifically, cable 112 and pulleys 114, 116 translate longitudinal oscillation of pillar 102 and float 104 relative to one another into rotational oscillation of upper pulley 116, thereby driving generator 108.

Wave energy converter 100 may incorporate a ballast weight 122—typically located near the bottom of pillar 102. Mooring cable 118 slack moors wave energy converter 100 to the bottom of body of water 10, so that the vertical motion of waves 12 subjects floating pillar 102 and float 104 to periodic buoyant forces causing them to longitudinally oscillate relative to one another as aforesaid. The oscillating motion characteristics of pillar 102 and float 104, such as the oscillation amplitude and phase relative to the oscillation of waves 12, is dependent upon the masses of pillar 102 and float 104, their relative hydrodynamic stiffness and damping characteristics, and the drafts of pillar 102 and float 104. Since generator 108 is coupled between pillar 102 and float 104, the generator load damping characteristic of generator 108 also affects the oscillating motion characteristics of pillar 102 and float 104.

Slug body 106 oscillates within pillar 102 in response to the force exerted by waves 12 on pillar 102. The oscillating motion of slug body 106 is dependent upon the mass of slug body 106, and by the stiffness and damping characteristics of visco-elastic connection 110. Oscillating motion of slug body 106 produces forces which are applied to pillar 102 through visco-elastic connection 110, such forces being dependent upon parameters such as the stiffness and damping characteristics of visco-elastic connection 110, and the mass of slug body 106. These forces alter the magnitude of the longitudinal oscillations of pillar 102, and also alter the phase lag of those oscillations with respect to waves 12.

To facilitate commercially efficient energy capture from wave motion incident on wave energy converter 100, and conversion of captured energy to electrical energy by generator 108, it is advantageous to control the relative motion of pillar 102 and float 104. In particular, it is desirable to control the motion of the pillar 102 and float 104 in response to incident wave motion, such that the movement of pillar 102 is significantly phase-shifted relative to the movement of float 104. That is, pillar 102 and float 104 advantageously move in opposition to one another, although hydrodynamic damping factors preclude attainment of precisely opposing (i.e. 180° phase-shifted) movement of pillar 102 relative to float 104. This increases the relative displacement of cable 112, thus increasing the driving force imparted to generator 108, and thereby increasing the generator's electrical energy output.

The dominant frequency and amplitude of natural wave motion (particularly that of ocean waves) tends to change gradually over time. It is desirable to dynamically control the relative motion of pillar 102 and float 104 to efficiently capture wave energy and convert the captured energy to electrical energy, throughout a range of wave motion frequency and amplitude. Such control is advantageously accomplished in-situ while wave energy converter 100 is deployed in a waterborne wave environment such as a marine or lacustrine environment. Wave energy converter 100 achieves this through controllable variation of at least one of: (1) the mass of slug body 106, (2) the stiffness or damping characteristics (or both) of visco-elastic connection 110, and (3) the load damping characteristic of generator 108.

The phase separation of the relative movement between pillar 102 and float 104 of wave energy converter 100 depends on their natural frequencies, which in turn depends on their buoyant stiffness, which is directly dependent on their respective cross-sectional areas and their total mass (i.e. their actual mass plus the added mass contributed by the water). Consider the floating bodies shown to the left in each of FIGS. 9A and 9B, in which the buoyant effect is modeled as an elastic spring driven by oscillations of the water's free surface. The floating body depicted in FIG. 9A corresponds to float 104. The floating body depicted in FIG. 9B corresponds to pillar 102. FIG. 9C corresponds to pillar 102 and float 104 interconnected to generator 108. The float has a large cross-sectional area at the waterline, a large buoyant stiffness and a high natural frequency of longitudinal oscillation. The pillar has a relatively small cross-sectional area at the waterline, and a lower natural frequency of longitudinal oscillation. The natural frequencies of the float and pillar oscillations can be further separated, or converged, by appropriately selecting their respective masses.

Figure 9A:
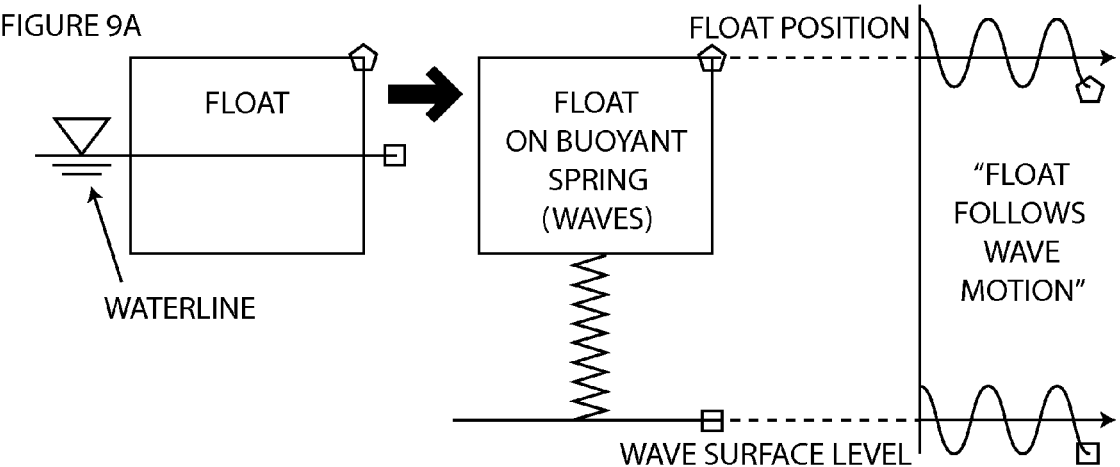
FIGS. 9A, 9A and 9C respectively schematically and graphically depict phase separation characteristics of the relative movement of the float, pillar and float-generator-pillar components of the FIG. 1 wave energy converter.
Figure 9B:
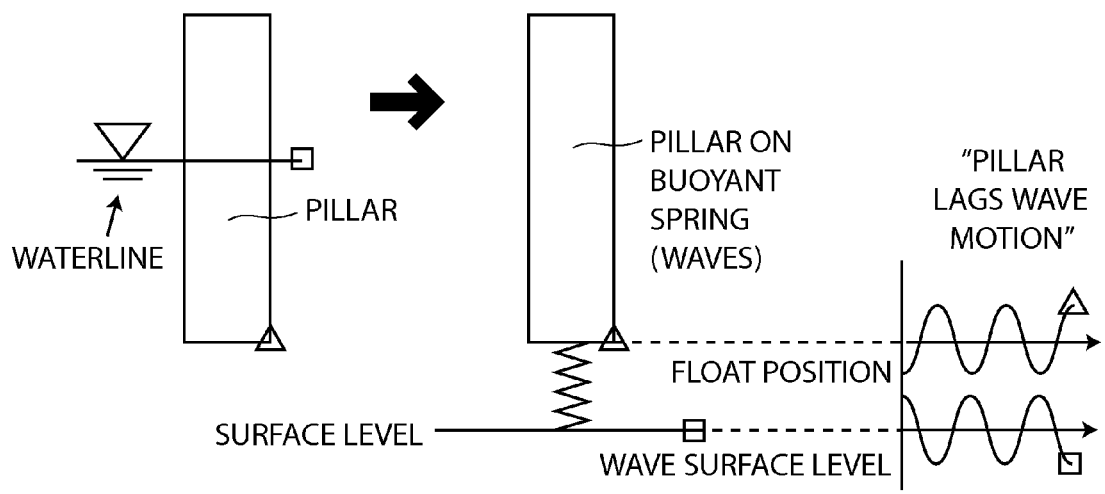
Figure 9C:
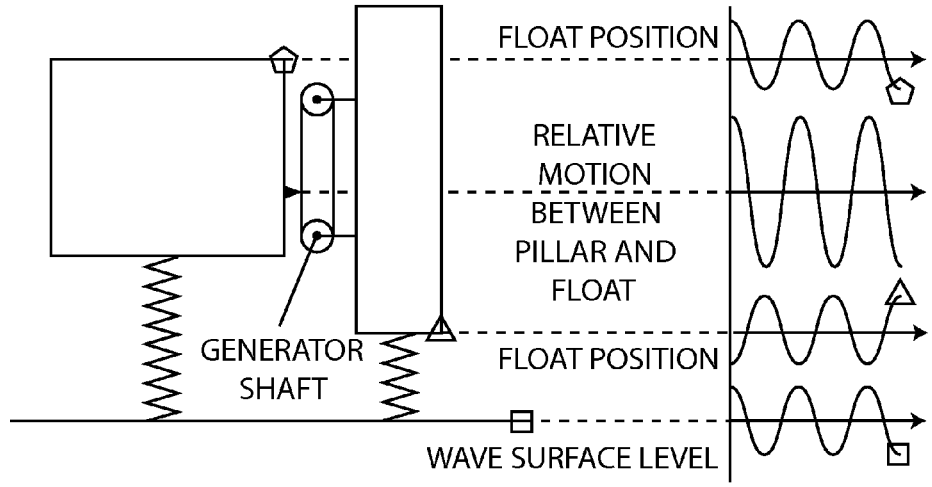

If the frequency of the motion of waves 12 is less than the float's natural frequency, then the float's motion tends to follow the motion of waves 12, as graphically illustrated to the right in FIG. 9A. If the frequency of the motion of waves 12 exceeds the pillar's natural frequency, then the pillar's motion tends to lag the motion of waves 12, as graphically illustrated to the right in FIG. 9B. As graphically illustrated to the right in FIG. 9C, the ideal (i.e. 180°) phase separation of pillar 102 and float 104 produces large rotation of generator 108, theoretically maximizing the generator's power output. However, the float's tendency to follow the motion of waves 12, and the pillar's tendency to lag the motion of waves 12, are counteracted by the hydrodynamic damping exerted on the float and pillar as they oscillate longitudinally relative to one another. Consequently, the theoretically ideal phase separation depicted graphically in FIG. 9C is not achievable in practice. The pillar's phase lag depends on the amount by which the wave frequency exceeds the pillar's natural frequency, and the float's wave-following behaviour depends on the amount by which the float's natural frequency exceeds the wave frequency. Since wave frequency changes gradually in an ocean wave environment, it is desirable to adjust the natural frequencies of the float and pillar in response to such changes.

Figure 10:
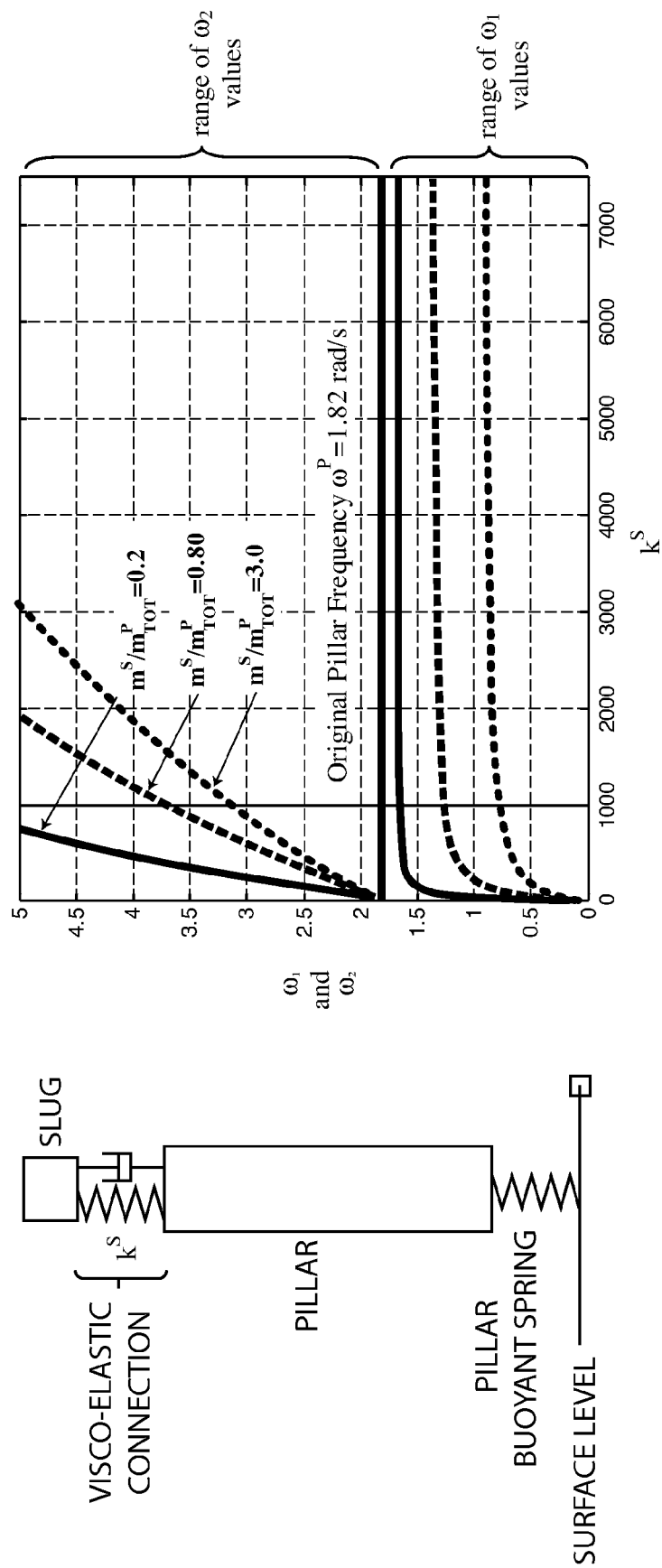
FIG. 10 schematically and graphically depicts variation of the natural frequencies $\omega_1$, $\omega_2$ of a reaction mass (slug) coupled to a pillar by a visco-elastic connection.

Neither the cross-sectional area nor the total mass of a floating body is easily adjustable. However, changes can be induced in the natural frequency of a floating body. FIG. 10 schematically depicts a small reaction mass ("slug") coupled to a pillar by a visco-elastic connection. Persons skilled in the art will understand that the FIG. 10 structure is similar to a classic vibration absorber for preventing machine vibrations. If the slug is free to oscillate, then the pillar-slug combination exhibits two natural frequencies: $\omega_1$ and $\omega_2$. $\omega_2$ is significantly higher than the pillar's natural frequency $\omega^P$, and $\omega_1$ is lower than $\omega^P$. Unlike a classic vibration absorber, the slug mass and the stiffness of the visco-elastic connection are selected so that $\omega_1$ is such that large pillar amplitudes and phase separation with respect to the float are achieved for the wave frequency most typically encountered in the wave environment in which the wave energy converter is deployed.

If the freely oscillating slug incorporates a linear-rotational mechanical connection as explained below, then the slug's overall effective mass can be increased or decreased, thereby increasing or decreasing $\omega_1$. Such adjustments to $\omega_1$ can be refined if the stiffness, $k^s$, of the visco-elastic connection is also adjustable. FIG. 10 graphically depicts representative values of $\omega_1$ and $\omega_2$ as a function of $k^s$ for slug mass to pillar mass ratios of 0.2, 0.8 and 3.0. Inspection of FIG. 10 reveals that these different ratios yield three quite different pairs of $\omega_1$ and $\omega_2$ curves. Changes in slug stiffness, $k^s$, correspond to different points on each pair of $\omega_1$ and $\omega_2$ curves. It will thus be understood that as the wave frequency changes, the pillar's natural frequency $\omega_1$ can be adjusted in order to increase the magnitude of the pillar's oscillations, and increase phase separation between the pillar and the wave, thus increasing phase separation between the pillar and the float.

The foregoing method of adjusting the pillar's natural frequency $\omega_1$ by changing the slug's effective mass and the visco-elastic support's stiffness $k^s$ facilitates increasing the generator's load damping to take advantage of increased phase separation between the pillar and the float. As generator load damping increases in a conventional two body system, there is a tendency for the phase of the pillar and float to come together and stall, since both bodies move in unison. The foregoing method facilitates significant increase in phase separation between the pillar and the float before the generator's load damping is increased, thus improving the capability to extract energy from the system while avoiding potential stalling of the pillar and float.

The foregoing description focuses on adjustment of the pillar's natural frequency. If the frequency of waves 12 is high with respect to the original natural frequency of the float, then the slug mass can be used as explained below to adjust the float's natural frequency to achieve larger amplitude longitudinal oscillations and phase separation relative to the pillar.

The actual physical mass of slug body 106 can be varied by adding mass to, or removing mass from slug body 106, e.g. by pumping fluid into or out of slug body 106 thereby increasing or decreasing its physical mass. Alternatively, the effective mass of slug body 106 can be varied by changing the orientation or configuration of slug body 106, as explained below in reference to FIGS. 2-5. The stiffness or damping characteristics (or both) of visco-elastic connection 110 can be varied, as is also explained below in reference to FIGS. 2-5. The load damping characteristic of generator 108 can be varied by changing the electrical resistance of the generator's load, or by changing the generator's electrical output to vary the electrical load dissipated across the generator during electric power generation.

Wave energy converter 100 desirably reduces or even prevents relative motion between pillar 102 and float 104 during periods of extreme wave motion such as during storms that could damage wave converter 100, to confine such relative motion within a predetermined acceptable operating range. This can be achieved through controllable variation of at least one of: (1) the mass of slug body 106, (2) the stiffness or damping characteristics (or both) of visco-elastic connection 110, and (3) the load damping characteristic of generator 108. An optional brake (not shown) can be provided to reduce or prevent relative motion between pillar 102 and float 104.

An electronic controller 126 can be provided to facilitate dynamic control of the mass of slug body 106, the stiffness or damping characteristics (or both) of visco-elastic connection 110, and the load damping characteristic of generator 108. If a brake is provided as aforesaid, controller 126 may also facilitate dynamic control of the brake and thereby facilitate controllable braking of the relative motion between pillar 102 and float 104. Electronic controller 126 may also optionally facilitate operational data recording, data telemetry and/or data communications between wave energy converter 100 and a shore-based or other facility, navigational lighting of wave energy converter 100, etc.

Figure 2:
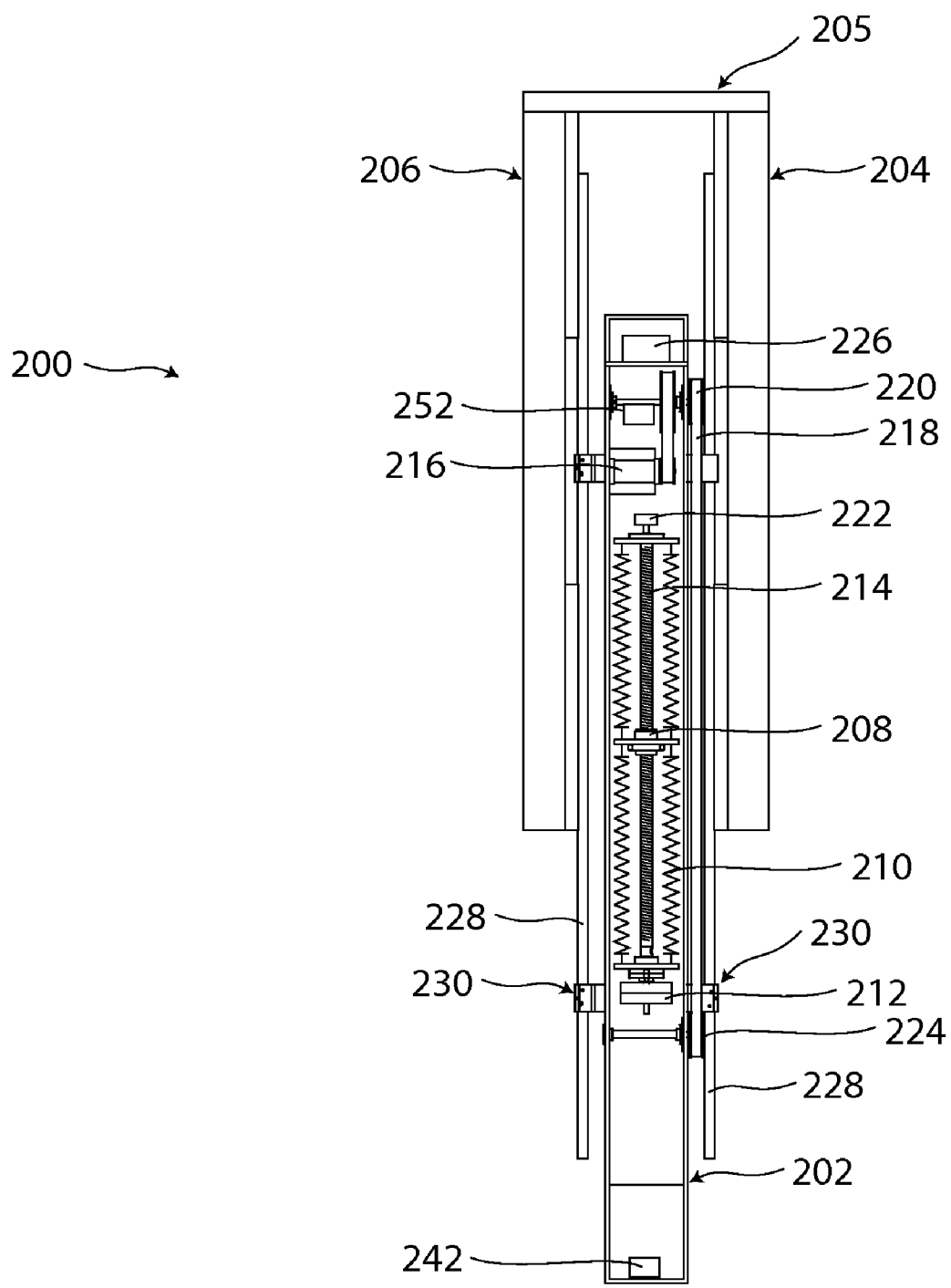
FIG. 2 is a partially fragmented, enlarged view of a portion of the FIG. 1 apparatus.

FIG. 2 depicts an alternative two-body wave energy converter 200 having a primary surface-piercing floating body, namely internal pillar 202; and two secondary surface-piercing floating bodies, namely floats 204, 206 which are spaced-apart from one another, spaced outwardly from pillar 202, and rigidly interconnected by transverse member 205. Longitudinally extending guide rails 228 are fixed to the inward sides of floats 204, 206. Bearings 230 are fixed to the outward sides of pillar 202 at spaced intervals. Longitudinally aligned groups of bearings 230 slidably engage guide rails 228 respectively, to permit longitudinally slidable oscillation of pillar 202 relative to floats 204, 206. Ball nut slug 208 is contained within and coupled to pillar 202 by a linear rotational mechanical connection. Alternatively, ball nut slug 208 may be located outside pillar 202 and coupled thereto by a linear rotational mechanical connection.

The FIG. 2 linear rotational mechanical connection includes a helically threaded screw such as ball screw 214 threadably coupled to ball nut slug body 208, and one or more elastic elements 210 attached to ball nut slug body 208. The longitudinally opposed ends of ball screw 214 are rotatably coupled to pillar 202. One end of each of elastic elements 210 is also coupled to pillar 202. The opposite end of each of elastic elements 210 is coupled to ball nut slug body 208. Rotatable mass 212 is rotationally coupled to the lower end of ball screw 214. Rotatable mass 212 may consist of one or more point masses, disc masses, substantially spherical masses, or other suitably configured masses symmetrically arranged about the centerline of the ball screw 214. Vertical wave motion subjects pillar 202 to periodic buoyant forces causing it to longitudinally oscillate, in turn causing longitudinal translation of ball nut slug 208 along ball screw 214, and in turn rotating ball screw 214 and rotatable mass 212.

Pillar 202 and floats 204, 206 are interconnected by drive belt 218, which is entrained over lower and upper pulleys 224, 220. One end of belt 218 is fixed to the lower end of float 204. The opposite end of belt 218 is fixed to the upper end of float 204. Lower pulley 224 is rotatably mounted to a lower portion of pillar 202. Upper pulley 220 is rotatably mounted to an upper portion of pillar 202. Generator 216 is drivingly coupled to upper pulley 220 to facilitate extraction of electrical energy from wave energy converter 200. Specifically, belt 218 and pulleys 224, 220 translate longitudinal oscillation of pillar 202 relative to floats 204, 206 into rotational oscillation of upper pulley 220, thereby driving generator 216.

The aforementioned longitudinal translation of ball nut slug 208 along ball screw 214 is dependent upon the mass of ball nut slug 208, and the combined rotational inertia of ball screw 214 and rotatable mass 212. Accordingly, longitudinal translation of ball nut slug 208 is dependent upon an effective slug mass corresponding to the physical mass of ball nut slug 208 plus the combined rotational inertia of ball screw 214 and rotatable mass 212. This effective slug mass can be controlled by changing the physical mass of ball nut slug 208, or by varying the rotational inertia of either ball screw 214 or rotatable mass 212, or both. The relative motion of pillar 202 and floats 204, 206 can be dynamically controlled to efficiently capture wave energy and convert the captured energy to electrical energy, throughout a range of wave motion frequency and amplitude, by controllable variation of at least one of: (1) the effective slug mass, (2) the stiffness or damping characteristics (or both) of elastic elements 210, and (3) the load damping characteristic of generator 216.

An electronic controller 226 coupled to a sensor 222 can be provided to facilitate dynamic control of the effective slug mass, the stiffness or damping characteristics (or both) of elastic elements 210, and the load damping characteristic of generator 216. Sensor 222 is coupled to ball screw 214 and produces an output signal representative of movement, due to wave motion, of ball nut slug 208 relative to pillar 202. As one example, sensor 222 may be a rotational encoding sensor responsive to rotational movement of ball screw 214 due to movement of ball nut slug 208 relative to pillar 202. Alternatively, sensor 222 may be a linear displacement sensor responsive to the axial position of ball nut slug 208 relative to pillar 202. As another alternative, a sensor 242 such as an accelerometer, Doppler velocity log, or other sensor capable of producing an output signal representative of pillar 202's absolute movement due to wave motion, can be provided at the lower end of pillar 202. As a still further alternative, a sensor 252, such as a rotational encoding sensor, can be coupled to the shaft driven by upper pulley 220. Sensor 252 produces a signal representative of the relative displacement and velocity of pillar 202 and float 204.

Electronic controller 226 can be configured to programmatically dynamically control the effective slug mass, the stiffness or damping characteristics (or both) of elastic elements 210, and the load damping characteristic of generator 216, in accordance with an appropriate control algorithm. For example, analytical frequency response functions can be used to derive the relative motion of ball nut 208 and pillar 202, the absolute motion of pillar 202, and the relative motion of float 204 and pillar 202. These frequency response functions are dependent on a series of physical parameters including the mass of ball nut slug 308, the stiffness and damping characteristics of elastic elements 210, the buoyant stiffness, mass and hydrodynamic damping of pillar 202, the buoyant stiffness, mass and hydrodynamic damping of float 204, and the load damping characteristic of generator 216. Electronic controller 226 can be programmed, using well known fast Fourier transform techniques, in order to produce a spectral decomposition of the signals produced by previously described sensors 222, 242 and 252. Then, by applying predetermined values for the aforementioned physical parameters, electronic controller 226 can evaluate the corresponding frequency response functions to provide a spectral representation, including wave frequency and height, of the wave motion causing the signals recorded by sensors 222, 242 and 252.

Non-linear optimization techniques can be used to determine the optimal dynamic control values of any combination of (1) the effective slug mass, (2) the stiffness or damping characteristics (or both) of elastic elements 210, and (3) the load damping characteristic of generator 216. The so determined optimal dynamic control values can then be applied to facilitate dynamic control as aforesaid.

Each elastic element 210 may be a spring, for example a coil spring, a linear spring, or concentrically-wound spring such as a clock spring. The springs advantageously have a variable stiffness characteristic, to facilitate dynamic control of the stiffness and damping of the visco-elastic connection between ball nut slug 208 and pillar 202. Other visco-elastic elements such as mechanically or electronically actuated hydraulic or pneumatic cylinders having variable stiffness characteristics can be used instead of springs.

Figure 3:
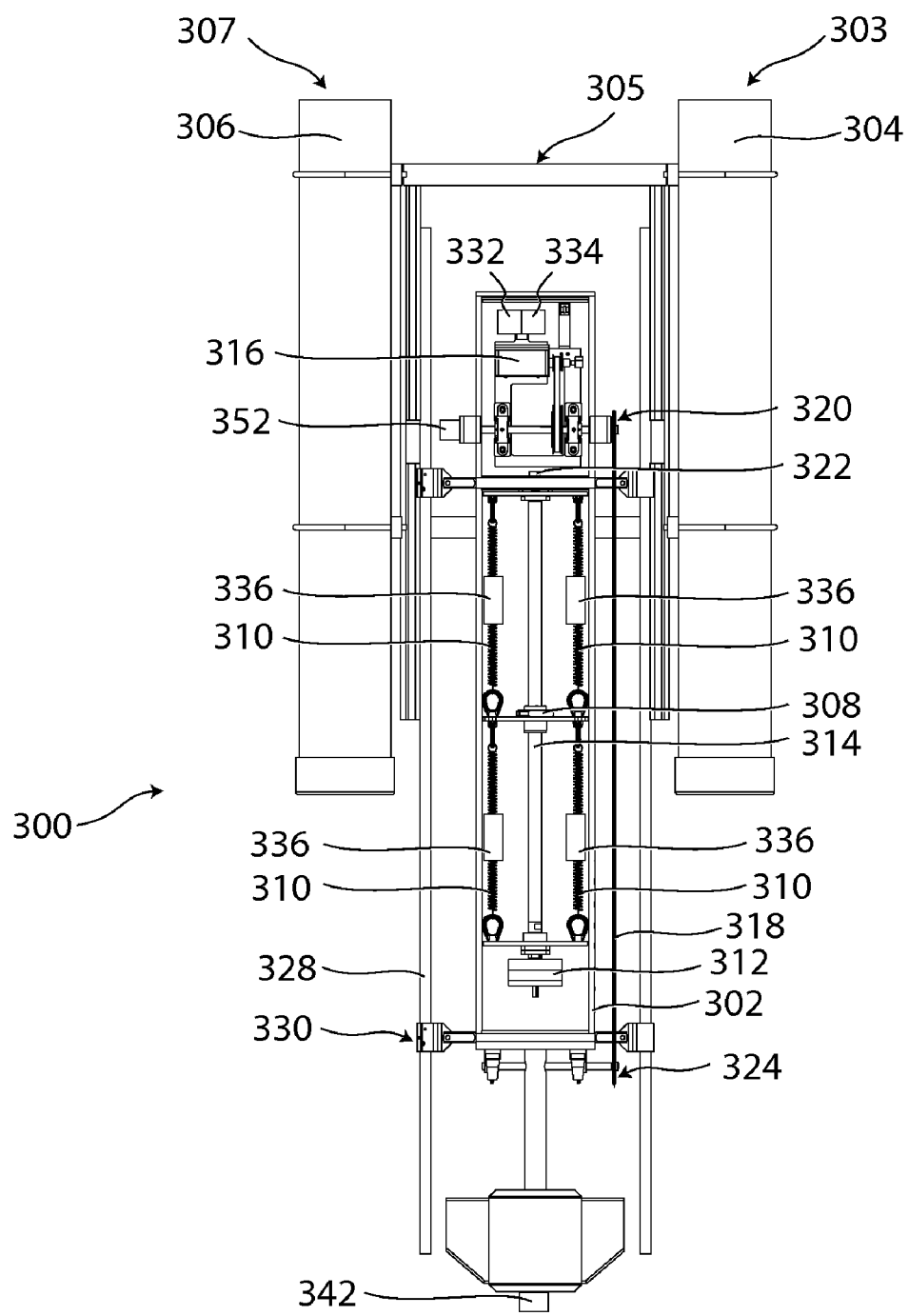
FIG. 3 is a schematic, partially fragmented elevation view of a two-body wave energy converter incorporating multiple secondary floats.

FIG. 3 depicts a further alternative two-body wave energy converter 300 having a primary surface-piercing floating body, namely internal pillar 302; and four spaced-apart secondary surface-piercing floating bodies, only two of which—namely floats 304, 306—are visible in FIG. 3. Floats 304, 306 are external to pillar 302 and are rigidly interconnected by transverse member 305. Another two floats (not visible in FIG. 3) are located behind and spaced-apart from floats 304, 306. All four floats are rigidly interconnected by transverse members similar to transverse member 305.

Longitudinally extending guide rails 328 are fixed to the inward sides of each one of the four floats. Bearings 330 are fixed to the outward sides of pillar 302 at spaced intervals. Longitudinally aligned groups of bearings 330 slidably engage guide rails 328 respectively, to permit longitudinally slidable oscillation of pillar 202 relative to the four floats. Ball nut slug 308 is contained within and coupled to pillar 302 by a linear rotational mechanical connection. Alternatively, ball nut slug 308 may be located outside pillar 302 and coupled thereto by a linear rotational mechanical connection.

The spaced-apart rectangular configuration (as viewed from above) configuration of wave energy converter 300 increases the oscillation efficiency of pillar 302 in some wave regimes, potentially increasing wave energy converter 300's ability of efficiently capture wave motion energy and conversion of the captured energy to electrical energy. Other spaced-apart configurations of multiple floats may be employed, including configurations incorporating three, five, six or more surface-piercing, rigidly interconnected floating bodies spaced around central pillar 302.

Wave energy converter 300 incorporates ball screw 314, ball nut slug body 308, elastic elements 310, rotatable mass 312, drive belt 318, lower and upper pulleys 324, 320 and generator 316. These elements are similar in construction and operation to ball screw 214, ball nut slug body 208, elastic elements 210, rotatable mass 212, drive belt 218, lower and upper pulleys 224, 220 and generator 216 respectively of the previously described wave energy converter 200, and need not be described further.

Wave energy converter 300 advantageously incorporates an electronic controller 332 similar to controllers 126, 226 of wave energy converters 100, 200. Controller 332 is electronically connected to computer readable storage medium 334 which stores computer readable control instructions, and is also electronically connected to electronic sensor 322. Controller 332 may be a microcontroller having a central processing unit (CPU) or other electronic processing device capable of reading and executing stored control instructions. Computer readable storage medium 334 may be a random access memory (RAM), read only memory (ROM), flash memory, magneto/optical memory or other known storage medium capable of storing instructions suitable for reading and execution by controller 332.

Controller 332 is programmed to facilitate dynamic control of at least one of: the mass and/or effective mass of ball nut slug 308, the stiffness and/or damping of elastic elements 310, and the load damping characteristic of generator 316, as previously explained. Sensor 322, which may be a rotational encoding sensor, is coupled to ball screw 314 so as to produce an output signal representative of movement, due to wave motion, of ball nut slug 308 relative to pillar 302. Alternatively sensor 342 (similar to sensor 242 of wave energy converter 200) and/or sensor 352 (similar to sensor 252 of wave energy converter 200) can be used to produce output signals representative of the absolute motion of pillar 302, and the motion of float 304 relative to pillar 302, respectively.

Controller 332 programmatically dynamically controls the effective slug mass, the stiffness or damping characteristics (or both) of elastic elements 310, and the load damping characteristic of generator 316, in accordance with an appropriate control algorithm and in response to signals received by controller 332 from sensor 322. The control algorithm may consist of control instructions stored in storage medium 334.

If wave energy converter 300 includes a brake (not shown), then controller 332 may also facilitate dynamic control of the brake as previously explained in relation to controller 126.

Figure 4:
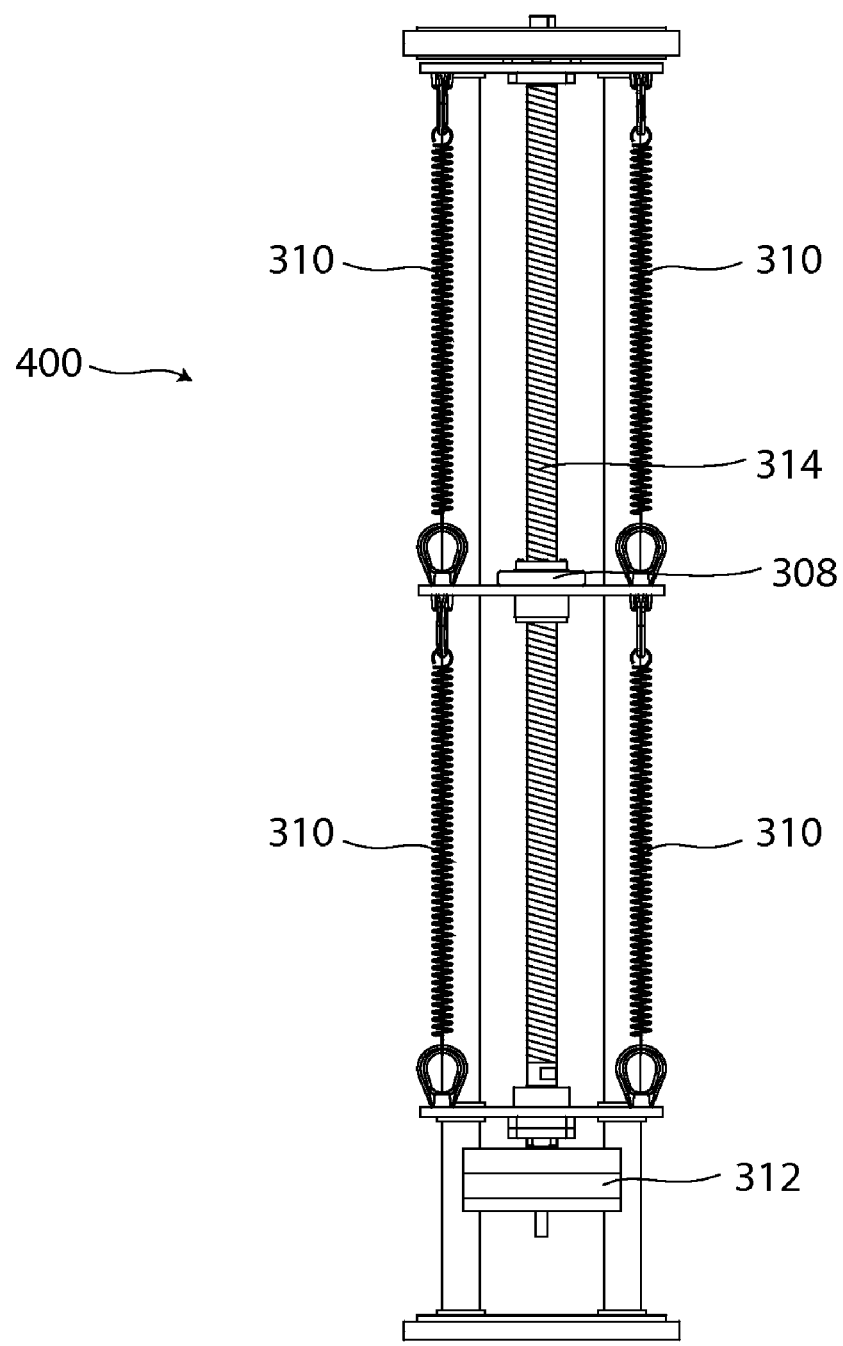
FIG. 4 is a schematic elevation view of the ball nut slug and ball screw components of the FIG. 3 apparatus.

Wave energy converter 300's ball screw 314, ball nut slug 308, elastic elements 310 and rotatable mass 312 collectively constitute a linear rotational mechanical connection 400, as shown schematically in FIG. 4. Wave energy converter 200's ball screw 214, ball nut slug 208, elastic elements 210 and rotatable mass 212 also collectively constitute a linear rotational mechanical connection similar to linear rotational mechanical connection 400. Motion of ball nut slug 308 can be dynamically controlled by dynamically varying the stiffness or damping characteristics (or both) of at least one of elastic elements 310, the actual mass of the ball nut slug 308, or the rotational inertia of rotatable mass 324.

A stiffness actuator 336 may be provided for each one of elastic elements 310, to facilitate dynamically controllable variation of the stiffness of each one of elastic elements 310 via suitable electronic coupling of controller 332, sensor 322 and actuators 336 in accordance with the control instructions stored in storage medium 334. This in turn facilitates dynamically controllable variation of the visco-elastic connection between ball nut slug 308 and pillar 302. Stiffness actuators 336 may be linear actuators, stepper motors, or servos capable of controlling the stiffness of elastic elements 310 by retracting and holding the coils of the springs which form visco-elastic connection 310 so as to stiffen visco-elastic connection 310, or by releasing the springs' coils to soften visco-elastic connection 310. The stiffness or damping characteristics (or both) of elastic elements 310 may also be dynamically controlled as aforesaid, for example by employing variable stiffness characteristic springs, or mechanically or electronically actuated hydraulic or pneumatic cylinders to form elastic elements 310.

The ratio of the effective mass of ball nut slug 308 to the mass of pillar 302 is desirably between about 0.75 and 3.5. The ratio of the submerged lengths of the primary and secondary surface-piercing floating bodies (i.e. the ratio of the submerged length of the internal pillar to the submerged length of the external float(s)) is desirably between about 0.75 and 1.35.

Figure 5:
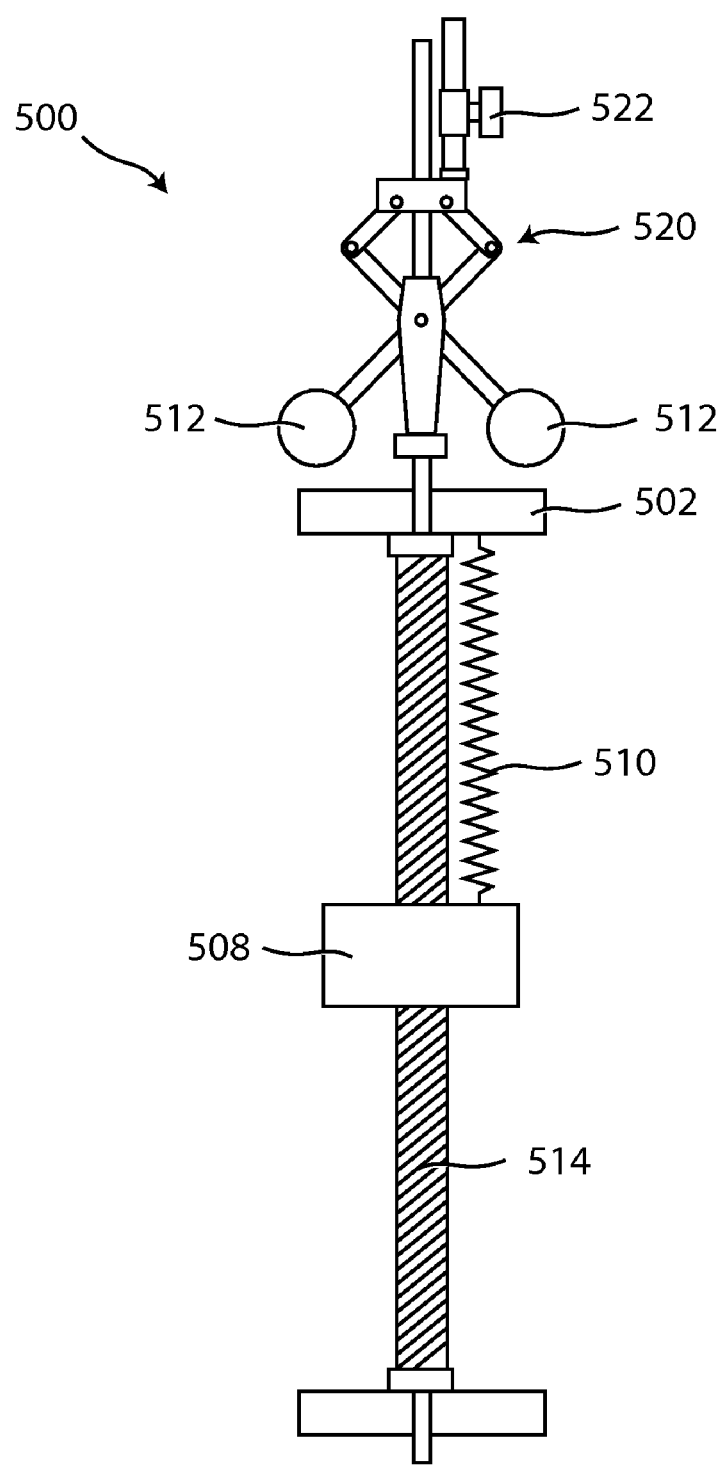
FIG. 5 is a schematic illustration of the ball nut slug and ball screw components of the FIG. 3 apparatus coupled to a rotatable mass.

FIG. 5 schematically depicts a dynamically controllable linear rotational mechanical connection 500 incorporating ball screw 514 threadably coupled to ball nut slug body 508, and at least one elastic element 510 which visco-elastically couples ball nut slug body 508 to pillar 502. One or more rotatable masses 512 are rotationally coupled to ball screw 514 by mechanical linkage 520 which incorporates one or more hinged arms for varying the radial displacement of rotatable masses 512 from the longitudinal axis of ball screw 514. Longitudinal translation of ball nut slug 508 along ball screw 514—caused by longitudinal oscillation of pillar 502 in response to incident wave motion—results in rotation of ball screw 514, thereby rotating rotatable masses 512. Linear actuator 522, which may be an electro mechanical linear actuator, is coupled to mechanical linkage 520 and controllably actuated to contract or extend mechanical linkage 520. Such contraction or extension causes corresponding inward or outward movement of rotatable masses 512 relative to the longitudinal axis of ball screw 514, thereby increasing or decreasing the rotational inertia of rotatable masses 512 about the axis of ball screw 514, and thus increasing or decreasing the effective mass of ball nut slug 508. Linear actuator 522 may be electronically controlled to dynamically control the effective mass of ball nut slug 508, in order to dynamically control the oscillating motion of pillar 502. The stiffness or damping characteristics (or both) of elastic element(s) 510 may also be dynamically controlled as aforesaid, for example by employing variable stiffness characteristic springs, or mechanically or electronically actuated hydraulic or pneumatic cylinders to form elastic element(s) 510.

Figure 6:
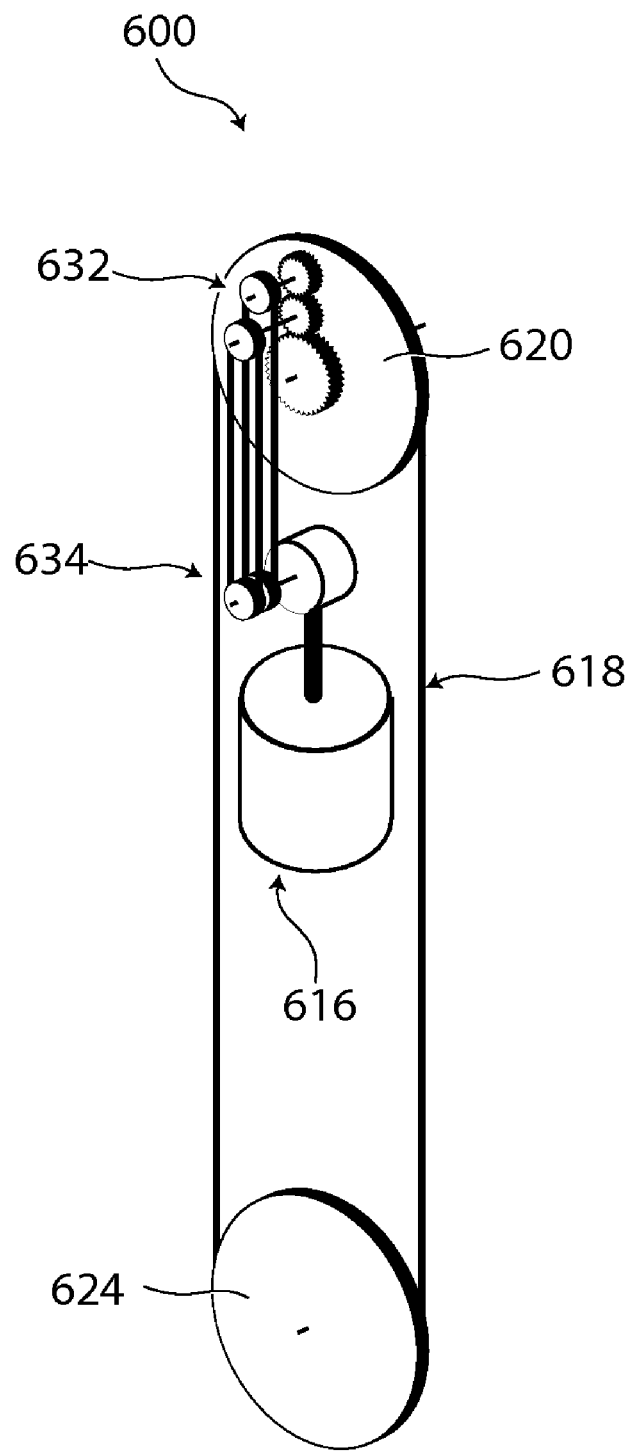
FIG. 6 is a schematic isometric view of a variable travel power takeoff for a wave energy converter.

FIG. 6 schematically depicts a variable travel power takeoff 600 which may be employed with any of wave energy converters 100, 200 or 300. Variable travel power takeoff 600 includes a drive element 618 (e.g. cable, belt, etc.) entrained over upper and lower pulleys 620, 624. Drive element 618 is connected to one of the wave energy converter's primary or secondary surface-piercing floating bodies, and upper pulley 620 is connected to the other one of those bodies, such that relative motion between the primary and secondary bodies rotates upper pulley 620. Generator 616 is drivingly coupled to upper pulley 620 to facilitate extraction of electrical energy from the wave energy converter. Specifically, drive element 618 and pulleys 620, 624 translate longitudinal oscillation of the primary and secondary bodies relative to one another into rotational oscillation of upper pulley 620, thereby driving generator 616.

The drive mechanism coupled between generator 616 and upper pulley 620 may include a pair of opposing sprague-type clutch mechanisms 632, 634, whereby rotation of pulley 620 in either direction causes unidirectional rotation of generator 616, which is advantageous if generator 616 is a DC generator. If generator 616 is an AC generator, the generator can be directly driven (in either direction) by upper pulley 620 without a unidirectional converter.

A power converter, rectifier, or other power conditioning device may be used in combination with or integrated into generator 616 (which may be an AC, DC, single or multi-phase electrical generator) to produce generated electrical power having desired characteristics. Generator 616 may alternatively be a non-rotational electrical generator, such as a linear electrical generator, in which case the wave energy converter can be directly mechanically coupled to the generator, without the need for a rotation-based coupling such as variable travel power takeoff 600. As a further alternative, the power takeoff mechanism may be a hydraulic, pneumatic, rack and pinion or other suitable means coupled between the wave energy converter's primary and secondary bodies.

Figure 7:
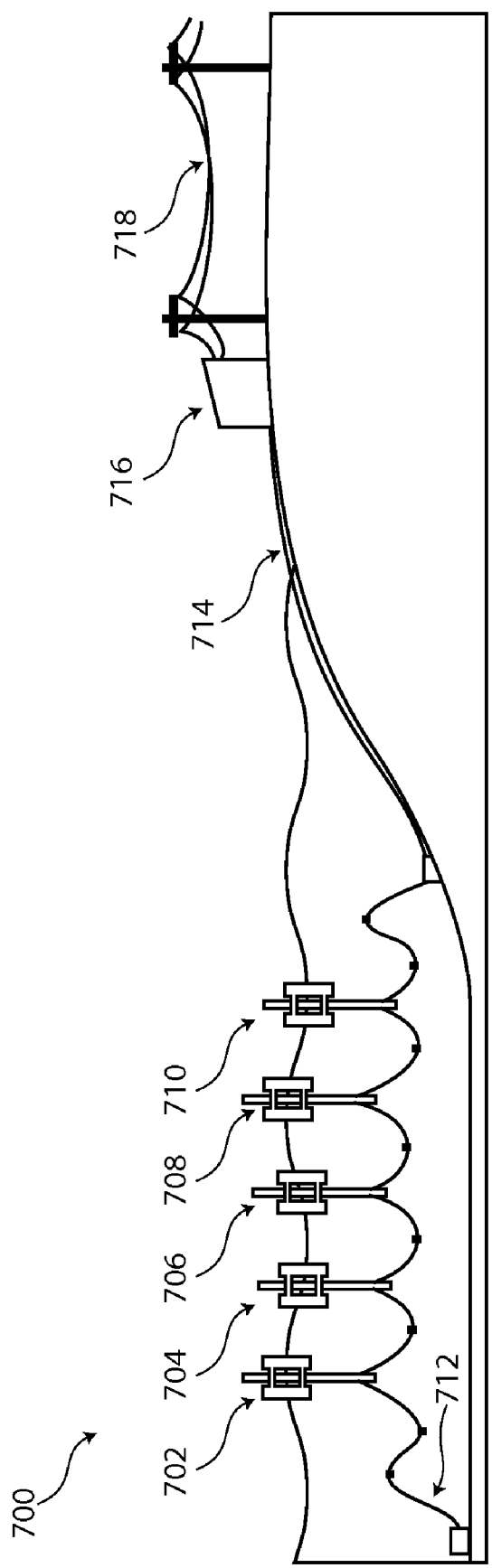
FIG. 7 schematically depicts a slack mooring arrangement and an electrical connection to a shore-based power distribution system for a wave farm incorporating a plurality of FIG. 1 type wave energy converters.

FIG. 7 schematically depicts a wave farm 700 incorporating a plurality of wave energy converters 702, 704, 706, 708, and 710—each of which may be similar to any one of the previously described wave energy converters 100, 200 or 300. Wave farm 700's wave energy converters are slack-moored to the sea bed by a single slack mooring cable 712. The wave energy converters are advantageously deployed in a regularly spaced arrangement to improve wave farm 700's energy capture and power generation capabilities. Electrical power produced by wave farm 700's wave energy converters is conducted by a common power cable 714 to shore-based power management unit 716, which may be connected to a load such as an existing electrical power distribution system 718.

Various exemplary methods for dynamically controlling the operation of wave energy converters 100, 200, 300 are now described with reference to FIG. 8. The object of each method is to regulate the relative oscillating motion of the wave energy converter's primary and secondary bodies in response to periodic wave motion, and thereby enhance electric power generation, by dynamically controlling at least one of: the mass of the slug mass (e.g. one of slug masses 106, 208 or 308), the rotational inertia of the rotatable masses (e.g. one of rotational masses 212, 312 or 512), the stiffness or damping characteristics (or both) of the visco-elastic connection (e.g. one of elastic elements 110, 210 or 310) between the slug mass and the primary body (e.g. one of pillars 102, 202 or 302), and the load damping characteristic of the generator (e.g. one of generators 108, 216 or 316).

Figure 8:
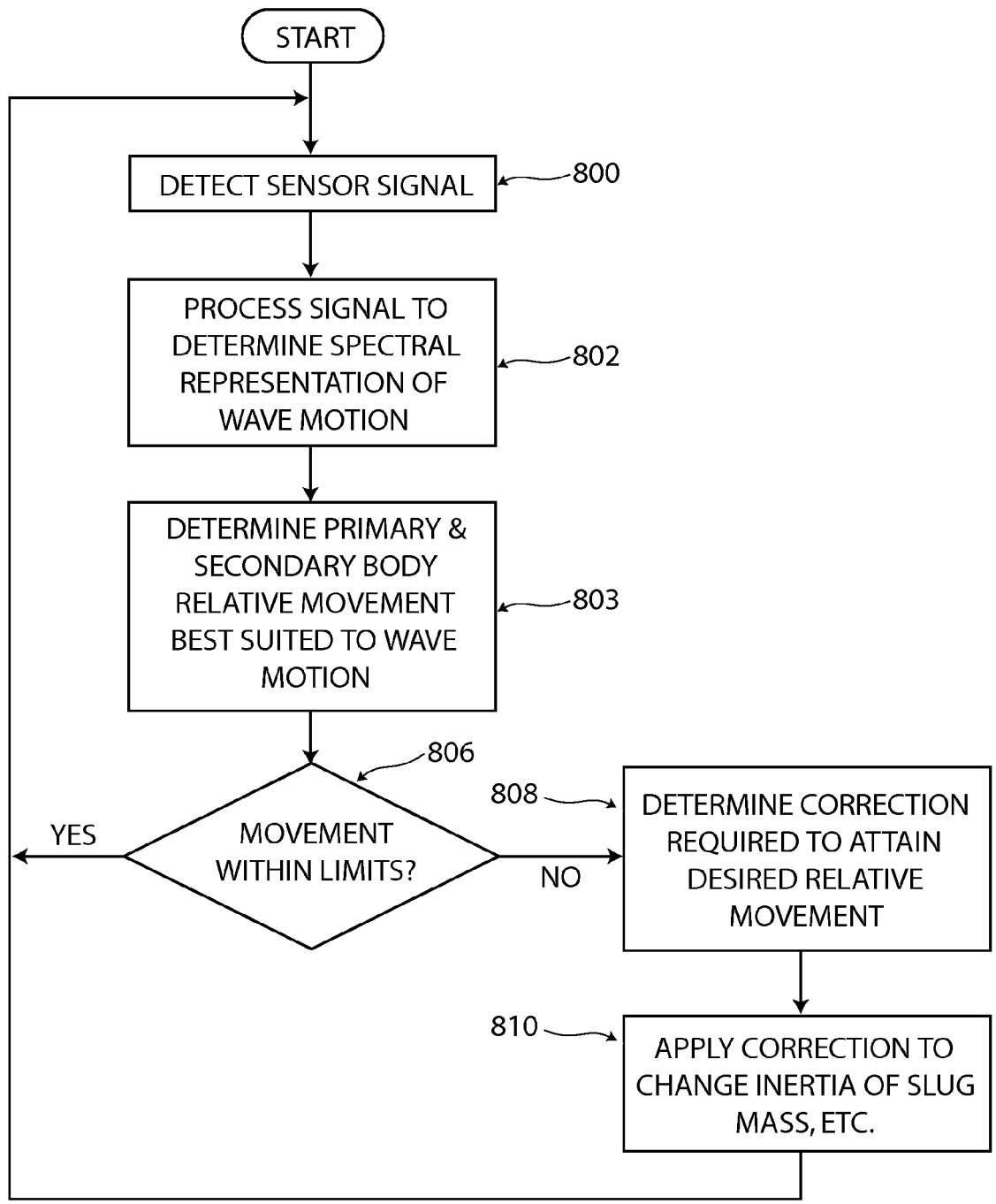
FIG. 8 is a flowchart depiction of a method of dynamically controlling the operation of the FIG. 1, 2 or 3 wave energy converters.

For example, signals representative of changes in the wave energy converter's motion can be monitored and used to dynamically control the mass of the slug mass, or the stiffness of the visco-elastic connection, or the generator's load damping characteristic, as illustrated in the FIG. 8 flowchart. In block 800, the controller (e.g. one of controllers 126, 226 or 332) detects the signals produced by the sensor (e.g. one of sensors 222, 322, 242, 342, 252 or 352). As previously explained, the signal produced by the sensor is representative of the movement, due to wave motion, of the slug mass relative to the primary body. In block 802, the controller processes the sensor's output signals to derive a spectral representation of the wave motion. This spectral representation may be determined on a substantially instantaneous basis, or over any desired period of time. The sensor's output signals may be analog or digital, continuous or discontinuous, and the controller's control algorithm may process the sensor's output signals to determine the spectral representation using any suitable known technique. In block 804, the controller determines the relative movement characteristics (i.e. magnitude and phase) of the primary and secondary bodies which are best suited to the wave motion determined in block 802 (i.e. the relative movement characteristics which will maximize the generator's power output). In block 806, the controller compares the relative movement characteristics determined in block 804 with a representation of the actual relative movement characteristics of the primary and secondary bodies (which the controller determines by processing the sensor's output signals), to determine whether the difference between the actual and the "best suited" movement characteristics are within predefined threshold limits. If the comparison result is positive (block 806 "Yes" output) then the foregoing operations are repeated, commencing at block 800. If the comparison result is negative (block 806 "No" output) then, as indicated in block 808, the controller determines an appropriate correction factor which can be applied to reduce the difference between the actual and the "best suited" movement characteristics of the primary and secondary bodies. In block 810, the controller selectably applies one or more control signals representative of the determined correction factor to suitable transducers or actuators coupled to the slug mass, to the rotational mass, to the visco-elastic connection between the slug mass and the primary body, or to the generator. As one example, such signals may be applied to increase the stiffness of the variable stiffness elastic elements which form the visco-elastic connection. As another example, such signals may be applied to pump fluid into or out of the slug mass in order to change its mass. The controller then continuously repeats the foregoing operations, commencing at block 800.

As another example, a frequency-based method can be used to dynamically control the wave energy converter's motion. This is achieved by using the controller to further process the sensor's output signals to derive a representation of a dominant frequency characteristic of the relative movement of the primary and secondary bodies. The dominant frequency may be derived in accordance with any suitable known method, such as by spectral analysis of the relative movement between the slug mass and the primary body. For example, the Fourier transform of such relative movement may be computed over a selected time interval, such as the wave motion time interval of the wave environment in which the wave energy converter is deployed. Since any motion developed within the wave energy converter is dependent upon the wave motion which subjects the primary and secondary bodies to periodic buoyant forces, the dominant frequency of any motion developed within the wave energy converter typically corresponds to the dominant frequency of the wave motion, which in turn typically corresponds to the desired frequency of motion of the primary body during normal operation of the wave energy converter. For example, a series of lookup values characterizing modelled or calibrated frequency response functions with corresponding instantaneous values of effective slug mass and/or stiffness may be stored in storage medium 334. Typically, the dominant frequency of the wave motion also corresponds to the most energetic frequency of wave motion. Alternatively, the controller may use signals derived from sensors 342, 352 such as accelerometers, Doppler velocity logs, and/or depth sensors to assist in determining a dominant frequency of wave motion. The controller is thus able to output one or more dominant frequency-related control signals which are selectably applied to suitable transducers or actuators coupled to the slug mass, the visco-elastic connection between the slug mass and the primary body, or the generator, as previously explained in relation to block 804 of FIG. 8.

As indicated above, the spectral analysis technique may use stored lookup values such as estimated frequency response functions of the various sensed motions to translate sensed device motions (the output of the frequency response functions) into an estimate of the wave spectrum (the input of the frequency response functions). This can be facilitated by gradually adjusting at least one control variable to cause a gradual change in a natural frequency of the wave energy converter system, for example the natural frequency of the pillar. The value of the pillar's absolute motion can be recorded as each adjustment is made. The dominant wave frequency will be apparent upon inspection of the recorded values, since the pillar resonates when its natural frequency coincides with the dominant wave frequency. This avoids the problem of having a small sensor signal being divided by a small frequency response function, which may occur if the selected control variables do not match up well with the actual dominant wave frequency and if the pillar motions are small at the dominant wave frequency.

As a further example, the control signals output by the controller may be selectably applied to linear actuator 522, as previously explained in relation to FIG. 5, so as contract or extend mechanical linkage 520, thereby causing corresponding inward or outward movement of rotatable masses 512 relative to the longitudinal axis of ball screw 514, thereby increasing or decreasing the rotational inertia of rotatable masses 512 about the axis of ball screw 514, and thus increasing or decreasing the effective mass of ball nut slug 508.

As yet another example, controller may use the "best suited" relative movement determined in block 804 to lookup and retrieve a generator load damping characteristic value stored in a table within computer readable medium 334. The retrieved value can then be applied by the controller to a suitable transducer or actuator coupled to the generator in order to vary the generator's load damping characteristic.

As a still further example, the controller may retrieve from a lookup table stored in computer readable medium 334 adjustment values which relate the dominant frequency of the relative movement of the primary and secondary bodies to corresponding desired values for the effective mass or stiffness of the slug mass. The retrieved adjustment values can then be applied to suitable transducers or actuators coupled to the slug mass. The stored lookup table values may be refined and updated over time in accordance with known techniques such as Kalman filtering, least squares identification and fuzzy logic methods, to improve the controller's ability to accurately estimate the adjustment values to be applied upon detection of given values of relative movement between the slug mass and the primary body. Such techniques may be applied by suitably programming the controller, or by periodically updating the contents of computer readable medium 334, e.g. via a suitable radio or other telemetry link. Similarly, the contents of computer readable medium 334 may be transmitted to an external location for analysis.

As a further example, the slug stiffness, the generator load and the rotational inertia of the rotatable mass can be adjusted to make the natural frequency of the primary body approximately equal to the natural frequency of the secondary body. This shuts the wave energy converter down—as is desirable if spectral analysis of the wave motion indicates extreme wave heights in the wave environment in which the wave energy converter is deployed, which might damage the wave energy converter. This is an advantage of including a rotatable mass such as masses 212, 312 in the wave energy converter. Such masses can be used to raise the natural frequency of the primary body towards that of the secondary body. A separate set of look up tables containing suitable control variable values for minimizing the relative displacement of the primary and secondary bodies can be provided to control the rotatable masses.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A wave energy converter comprising:
   a primary surface-piercing floating body;
   a secondary surface-piercing floating body interconnected to the primary body for longitudinal oscillation of the primary and secondary bodies relative to one another;
   a slug mass visco-elastically connected to the primary body, the slug mass having an effective mass characteristic, a stiffness characteristic and a damping characteristic; and
   a generator drivingly connected between the primary and secondary bodies, the generator having a load damping characteristic;
   wherein;
   at least one of the effective mass characteristic, the stiffness characteristic, the slug mass damping characteristic and the generator load damping characteristic is dynamically controllable;
   the primary body comprises a pillar;
   the slug mass is supported inside the pillar; and
   the secondary body comprises at least two rigidly interconnected floats spaced-apart from one another and spaced outwardly from the pillar.

2. A wave energy converter according to claim 1, further comprising a power takeoff drivingly connecting the generator between the primary and secondary bodies.

3. A wave energy converter according to claim 1, wherein the generator load damping characteristic is dynamically controllable by varying at least one of an electrical resistance characteristic and an electrical output characteristic of the generator.

4. A wave energy converter according to claim 1, further comprising a controller electronically coupled to the wave energy converter to programmatically, dynamically control at least one of the effective mass characteristic, the stiffness characteristic, the slug mass damping characteristic and the generator load damping characteristic.

5. A wave energy converter according to claim 4, further comprising at least one sensor coupled to the wave energy converter, the sensor producing an output signal representative of at least one of a position of the primary body relative to the position of the secondary body, a position of the slug mass relative to the position of the primary body, an absolute position of the primary body, an acceleration of the primary body, and an acceleration of the secondary body.

6. A wave energy converter according to claim 5, wherein the controller is electronically connected to the sensor and responsive to the output signal produced by the sensor.

7. A wave energy converter according to claim 1, wherein the slug mass is visco-elastically connected to the primary body by at least one elastic element.

8. A wave energy converter according to claim 7, wherein the elastic element comprises at least one of a spring, a hydraulic cylinder and a pneumatic cylinder.

9. A wave energy converter according to claim 8, wherein the elastic element is dynamically controllable to vary stiffness characteristic of the slug mass.

10. A wave energy converter according to claim 1, wherein the slug mass is visco-elastically connected to the primary body by a linear rotational mechanical connection.

11. A wave energy converter according to claim 10, wherein the slug mass comprises a ball nut slug body and the linear rotational mechanical connection comprises:
    a ball screw threadably coupled to the ball nut slug body; and
    a rotatable mass rotatably coupled to the ball screw;
    wherein longitudinal translation of the ball nut slug body along the ball screw rotates the ball screw and the rotatable mass.

12. A wave energy converter according to claim 11, wherein the rotatable mass has a rotational inertia characteristic dynamically controllable to vary the effective mass characteristic of the slug mass.

13. A wave energy converter according to claim 12, wherein the rotatable mass is rotatably coupled to the ball screw by a mechanical linkage operable to vary the rotational inertia characteristic of the rotatable mass.

14. A wave energy converter according to claim 13, wherein the mechanical linkage comprises one or more hinged arms for varying radial displacement of the rotatable mass relative to a longitudinal axis of the ball screw.

15. A wave energy converter according to claim 1, the primary body having a primary body mass, wherein the ratio of the effective slug mass to the primary body mass is at least about 0.75.

16. A wave energy converter according to claim 1, the primary body having a primary body mass, wherein the ratio of the slug mass to the primary body mass is between about 0.75 and 3.5.

17. A wave energy converter according to claim 1, wherein the at least two rigidly interconnected floats are interconnected by a transverse member.

18. A wave energy converter according to claim 1, wherein adjacent ones of the at least two rigidly interconnected floats are radially spaced-apart from one another around the pillar.

19. A wave energy converter according to claim 18, wherein
    the primary body has a first submerged length;
    the secondary body has a second submerged length; and
    the ratio of the first submerged length to the second submerged length is between about 0.75 and 1.35.

20. A method for controlling a wave energy converter having a primary surface-piercing floating body, a secondary surface-piercing floating body interconnected to the primary body for longitudinal oscillation of the primary and secondary bodies relative to one another, a slug mass, a visco-elastic connection between the slug mass and the primary body, an electrical generator drivingly connected between the primary and secondary bodies, and a sensor, wherein:
    the slug mass has an effective mass characteristic, a stiffness characteristic and a damping characteristic;
    the generator has a load damping characteristic;
    the sensor is electronically coupled to the slug mass, to the primary body, to the visco-elastic connection, and to the generator;
    the sensor produces an output signal representative of a position of the primary body relative to a position of the secondary body;

the method comprising:

detecting the sensor output signal;

processing the detected sensor output signal to derive a representation of relative movement between the slug mass and the primary body;

producing a first control signal corresponding to the derived representation of relative movement between the slug mass and the primary body; and applying the first control signal to at least one of the slug mass and the visco-elastic connection to vary at least one of the effective mass characteristic of the slug mass, the stiffness characteristic of the slug mass and the damping characteristic of the slug mass.

21. A method according to claim 20, further comprising:

processing the detected sensor output signal to derive a representation of a dominant frequency characteristic of the relative movement between the slug mass and the primary body;

producing a second control signal corresponding to the derived representation of the dominant frequency characteristic of the relative movement between the slug mass and the primary body; and applying the second control signal to at least one of the slug mass and the visco-elastic connection to vary at least one of the effective mass characteristic of the slug mass, the stiffness characteristic of the slug mass and the damping characteristic of the slug mass.

22. A method according to claim 20, further comprising applying the first control signal to the generator to vary the load damping characteristic of the generator.

23. A method according to claim 22, further comprising:

processing the detected sensor output signal to derive a representation of a dominant frequency characteristic of the relative movement between the slug mass and the primary body;

producing a second control signal corresponding to the derived representation of the dominant frequency characteristic of the relative movement between the slug mass and the primary body; and applying the second control signal to at least one of the slug mass, the visco-elastic connection and the generator to vary at least one of the effective mass characteristic of the slug mass, the stiffness characteristic of the slug mass, the damping characteristic of the slug mass and the load damping characteristic of the generator.

24. A method according to claim 20, wherein the visco-elastic connection comprises a rotatable mass and wherein at least a portion of the effective mass characteristic of the slug mass comprises rotational inertia of the rotatable mass, the method further comprising applying the first control signal to the rotatable mass to vary the rotational inertia of the rotatable mass.

25. A method according to claim 20, wherein the visco-elastic connection comprises at least one elastic element, the method further comprising applying the first control signal to the at least one elastic element to vary a stiffness characteristic of the at least one elastic element.

26. A method according to claim 20, further comprising a controller electronically coupled to the sensor, to the slug mass (106, 208 or 308), to the primary body, to the visco-elastic connection, and to the generator, the method further comprising:

receiving the detected sensor output signal in the controller;

processing the detected sensor output signal in the controller to derive the representation of relative movement between the slug mass and the primary body; and producing the first control signal as an output signal of the controller.

27. A method according to claim 26, further comprising:

processing the detected sensor output signal in the controller to derive a representation of a dominant frequency characteristic of the relative movement between the slug mass and the primary body;

producing a second control signal as an output signal of the controller, the second control signal corresponding to the derived representation of the dominant frequency characteristic of the relative movement between the slug mass and the primary body; and applying the second control signal to at least one of the slug mass and the visco-elastic connection to vary at least one of the effective mass characteristic of the slug mass, the stiffness characteristic of the slug mass and the damping characteristic of the slug mass.

28. A method according to claim 27, wherein the visco-elastic connection comprises a rotatable mass and wherein at least a portion of the effective mass characteristic of the slug mass comprises rotational inertia of the rotatable mass, the method further comprising applying the first control signal to the rotatable mass to vary the rotational inertia of the rotatable mass.

29. A method according to claim 28, wherein the visco-elastic connection comprises at least one elastic element, the method further comprising applying the first control signal to the at least one elastic element to vary a stiffness characteristic of the at least one elastic element.

\* \* \* \* \*